United States Patent
Zehr

[11] 3,758,070
[45] Sept. 11, 1973

[54] SELF-CLOSING, GUILLOTINE-TYPE, SHUTOFF VALVE

[75] Inventor: William J. Zehr, Des Plaines, Ill.

[73] Assignee: The Protectoseal Company, Bensenville, Ill.

[22] Filed: Sept. 22, 1972

[21] Appl. No.: 291,201

[52] U.S. Cl............... 251/86, 251/147, 251/179, 251/300
[51] Int. Cl............................................. F16k 3/04
[58] Field of Search.................... 251/86, 147, 179, 251/200

[56] References Cited
UNITED STATES PATENTS

| 2,850,259 | 9/1958 | Larson | 251/86 |
| 1,123,813 | 1/1915 | Smith | 251/147 |
| 383,995 | 6/1888 | Scoville | 251/300 X |
| 845,260 | 2/1907 | Raphiel | 251/179 |

Primary Examiner—Harold W. Weakley
Attorney—Charles W. Rummler, William A. Snow et al.

[57] ABSTRACT

A hand-operated, guilliotine-type, self-closing, viscous liquids shutoff valve having maximum effectiveness in self-aligned sealing pressure between the valve plate and valve seat when the valve is closed, and reduced forces resisting the hand effort when the valve is open, and effectively wiping the liquid from the valve seat in the operation thereof.

4 Claims, 6 Drawing Figures

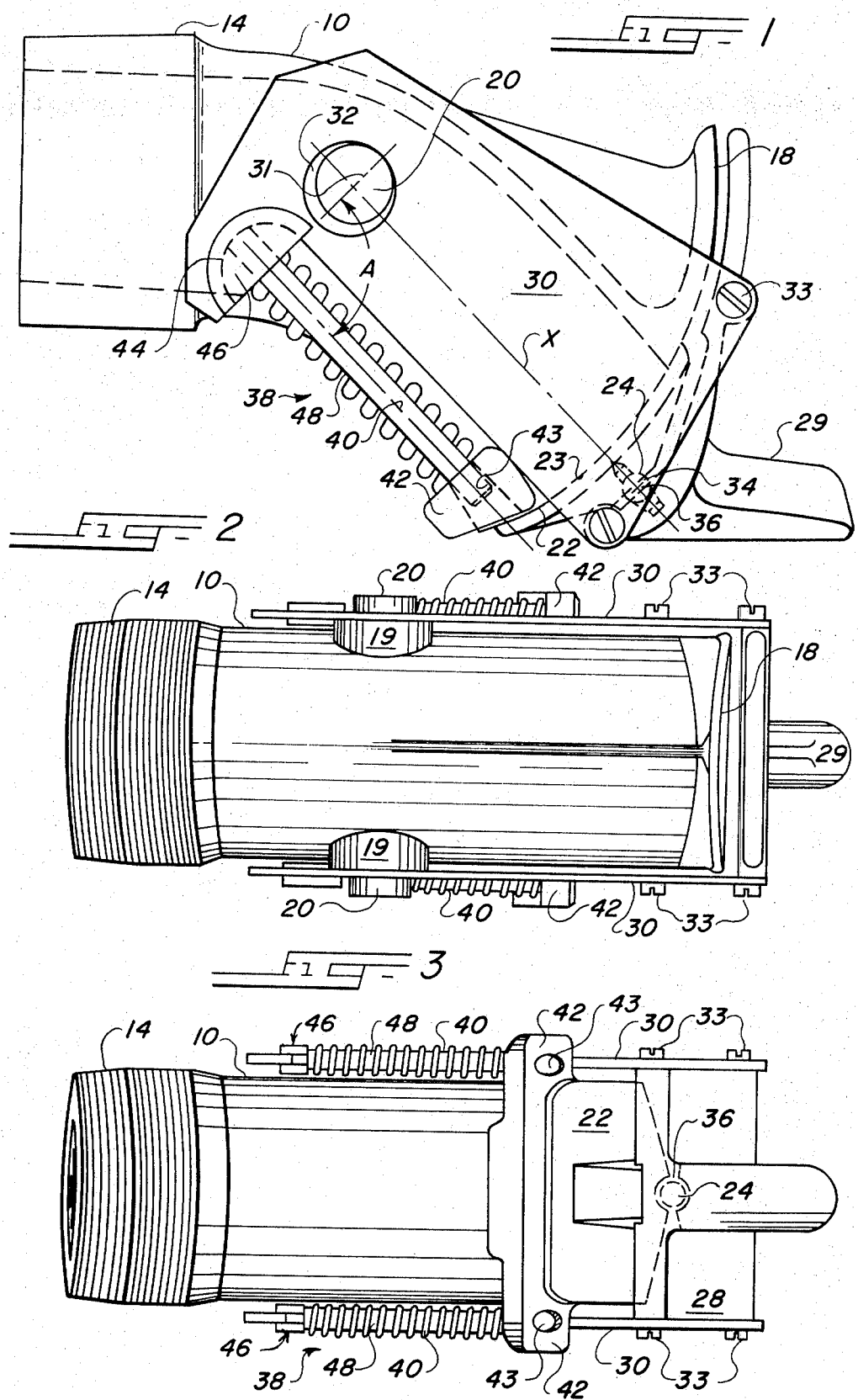

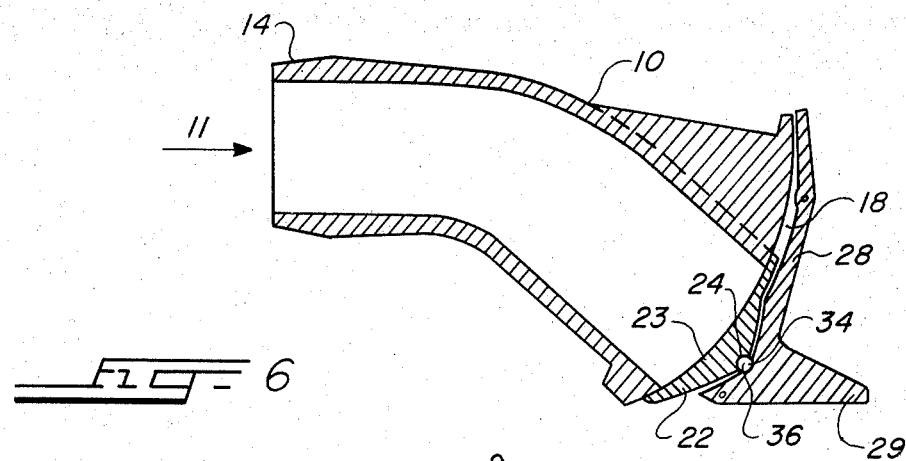
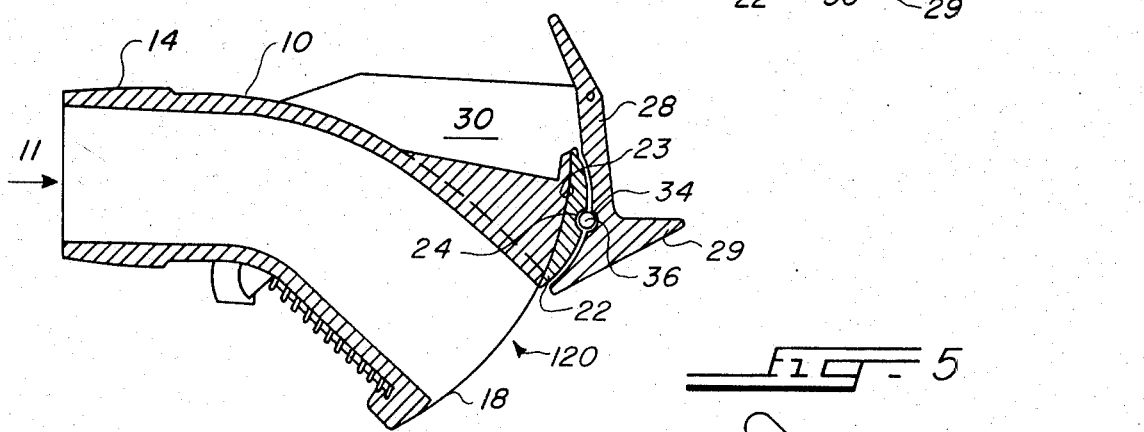
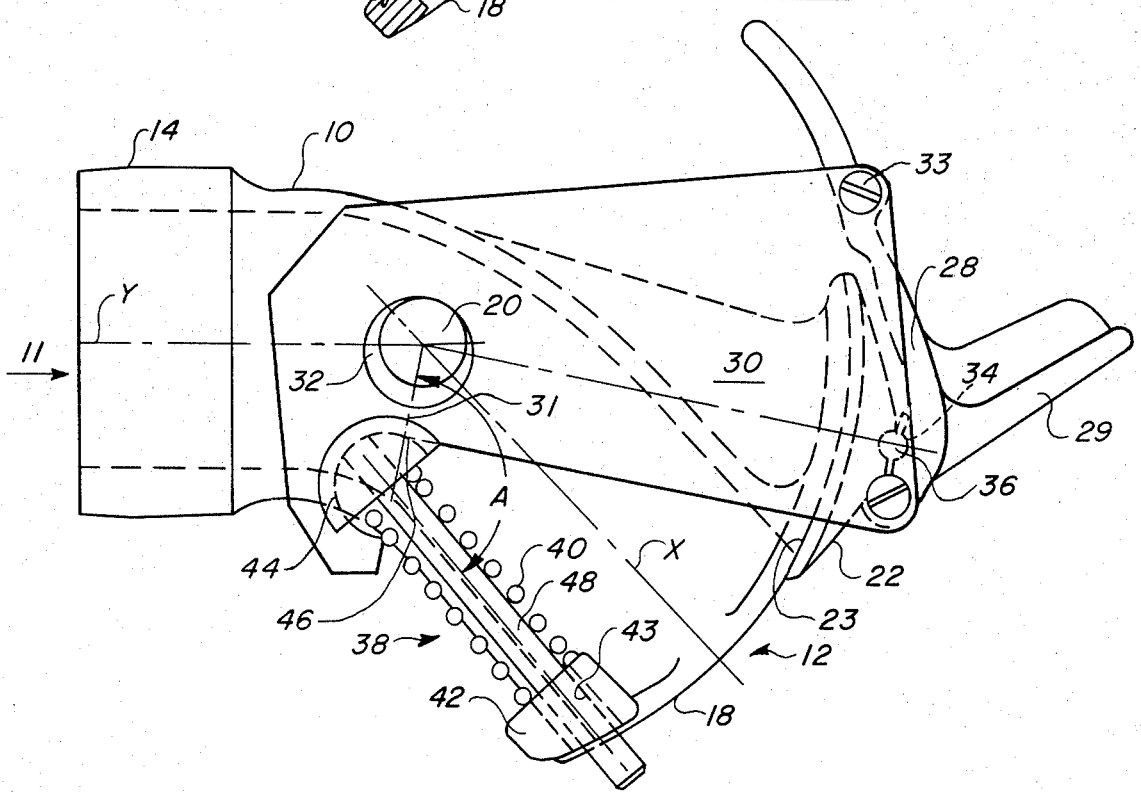

3,758,070

SELF-CLOSING, GUILLOTINE-TYPE, SHUTOFF VALVE

BACKGROUND OF THE INVENTION

This invention relates to a self-closing, guillotine-type, viscous liquids shutoff valve employed for oil, molasses and the like. Guillotine-type shutoff valves having a substantially circular discharge orifice terminating in an arcuate seat surface on the valve body to which is applied an arcuate valve plate adapted to slidingly gate the orifice in the shutoff of the flow of viscous liquids therefrom, have been in common use for many years. The valve plate is moved from an orifice covering position to an open position by a valve-operating lever or handle which is pivoted on the valve body on an axis coincident with the radius of the arcuate seat surface.

In the prior art, it has been the practice to use valve-operating mechanisms comprising a first auxiliary compression spring which bears tangentially to the arcuate surface on the valve gate to return the valve-operating lever and gate to the shutoff position in the self-closing thereof, and a second compression spring which bears inwardly in a radial direction upon the back side of the valve plate self-aligningly pressing the sealing face of said plate against the arcuate seat on the valve body for the sealing thereof in the shutoff position of the valve.

Disadvantages in the operating characteristics of these self-closing, guillotine-type shutoff valves of the prior art lie in (1) a continually increasing hand force requirement as the valve is opened wider, and (2) a constant pressure of the valve plate against the sealing surface of the body even when it is not needed in the valve-open position. The operating mechanisms of these valves in general function through the direct central and tangential application of forces from respective auxilliary compression springs therein to actuate the self-closing feature and to self-aligningly maintain the sealing pressure of the face of the valve plate thereof against the valve seat on the body. At this point, it should be recognized that spring mechanisms in such valves which generate forces which are centrally and tangentially directed are to be distinguished from spring mechanisms which act at varying eccentricities and generate forces which vary therewith, as will be later discussed.

Specific examples of the prior art are illustrated in the Ritter U.S. Pat. No. 1,974,083 and Kuckhoff U.S. Pat. No. 1,977,234, which disclose self-closing guillotine valves. The Ritter valve depends on an auxilliary spring to return the lever and gate and has the disadvantage of (1) a continually increasing hand force requirement as the valve is opened wider, and (2) constant pressure of the valve plate against the sealing surface of the body, even though this is not necessary when the valve is open. The Kuckhoff valve depends on sealing surfaces which are plane or cylindrical sections that are not normal or eccentrically situated from the center-of-revolution of the operating lever. Again, this has the disadvantages of (1) increasing force required as the opening of the valve is increased, and (2) continually increasing pressure and drag of the valve plate against the sealing surface in the area where it is not required, i.e., in the open position.

There is thus an established need for a guillotine-type, self-closing shutoff valve in which the hand force required to open and hold the valve open does not increase as fast as the force developed by compressing the spring, and as the valve is opened the pressure of the valve plate against the body becomes less direct; thus reducing the resistance to closing of the valve, making for easier operation with less wear while at the same time maintaining high pressure between the valve plate and the valve seat for maximum sealing of the valve in the closed position.

SUMMARY OF THE INVENTION

A guillotine-type, self-closing valve wherein the valve self-closing operating and sealing mechanism comprises a single pair of parallel compression coil springs having spring axes which are straddlingly-spaced across the body of the valve in a sidewise direction thereof, which springs are orientated in a plane perpendicular to the plane of opening and closing of the valve and the axes of which springs are directed along in parallel relation with reference to the centerline of the discharge orifice of the valve. Similar ends of said springs are similarly fixedly anchored to seats on the body of the valve adjacent to the discharge orifice in straddle relation thereto, and opposed ends of each of said springs are pivotally mounted on opposite sides thereto on respective arms of hand levers which in turn are loosely pivotally mounted on trunnion pins having a common axis and extending sidewardly from the valve body at the center of the arcuate seat thereof. In closed position, the centers of the pivotal ends of said springs lie on reference lines which bear a fixed relation to the hand lever and pass through the common centers of the hand lever trunnion pivot pins. At valve shutoff, said lines lie in a direction at right angles to the centerline of the discharge orifice. Said springs have lines of action which cut said lines below the hand lever pivot center in opposition to the opening of the valve so that the compression force of the springs always tends to self-close the valve. These reference lines and the positions of these pivotal ends of the springs located thereon coincide with the torque arm for each spring of the mechanism. Thus, in the closed position, the direction of the line of action of the force of said springs is in direct line with and most effective in producing force for holding the valve plate against the body with maximum sealing. A simple ball and socket device, or the like, is centrally mounted in opposed sockets on the valve plate and on the underside of hand lever structure, respectively, on the centerline of the discharge orifice when the valve is in the closed position for self-aligning the valve plate against the valve seat when the valve is in the closed position for maximum effective sealing thereon.

In the valve open position, the aforementioned reference lines which pass through the hand lever pivot center rotate with reference to the arms on the hand lever structure and the valve plate as the valve is opened so that the angle between the lines of action of the springs and these reference lines on the arms becomes greater than the right angle such as existed in the aforementioned valve-shut position. The overall effect is that for this valve configuration, the torque arm of each spring of the self-closing and sealing mechanism is decreased as the valve is opened. As the valve is opened, though the spring force is increased by compression of the springs from the eccentric movement of the pivoted ends thereof, the torque arm for each spring is proportionally less, and thus the hand force required on the hand lever to open and hold the valve open decreases.

Also, as the valve is opened, the vector component of force pressing the valve plate against the body becomes less direct so that again the hand force required to open and hold the valve open is less because the frictional force between the valve plate and the valve seat is reduced.

BRIEF DESCRIPTION OF THE DRAWINGS

FIG. 1 is a side elevational view of the viscous liquid shutoff valve of this invention in the closed position;

FIG. 2 is a top elevational view of the shutoff valve in the closed position;

FIG. 3 is a bottom elevational view of the shutoff valve in the closed position;

FIG. 4 is a cross-sectional view showing the valve plate in the closed position over the discharge orifice;

FIG. 5 is a side elevational view of the shutoff valve in the open position; and FIG. 6 is a vertical cross-sectional view of the shutoff valve showing the valve plate in the open position on the arcuate valve seat.

DETAILED DESCRIPTION OF THE DRAWINGS

The viscous liquid self-closing, shutoff valve of this invention comprises a valve body 10 having an elbowed bore 11, as shown in FIGS. 4, 5 and 6, with a substantially circular discharge orifice 12 in fluid connection with said bore 11 at one end thereof and a threaded pipe fitting 14 in fluid connection with the bore 11 at the opposite end thereof. Trunnion bosses 19 are cast in the outer sides of the body 10 diametrically opposite each other at a location which is substantially intermediate between the pipe fitting end 14 and the discharge orifice end 12, as shown in FIG. 2, which is roughly on the centerline "X" of the discharge orifice 12 at its intersection with the centerline "Y" of the pipe fitting 14, as shown in FIG. 5. Trunnion pins 20 are part of the bosses 19 on a common trunnion axis and extend sidewardly therefrom, as shown in FIGS. 1, 2 and 5.

A convex, cylindrically arcuate seat 18, which terminates the end surface of discharge orifice 12, as shwon in FIGS. 5 and 6, is cylindrically shaped about the axis of the circular trunnion pins 20, as shown in FIGS. 1 and 2. A valve plate 22 having a concave arcuate sealing face 23 of the same radius of curvature as the arcuate valve seat 18 is slidingly applied to the arcuate seat 18, as shown in FIGS. 1, 3, 4, 5 and 6, to gate the orifice 12 in the shutoff and opening of the valve. A ball socket 24 is located in the back face of valve plate 22 on the centerline "X" of the discharge orifice when the valve is closed, as shown in broken lines in FIGS. 1, 3, 5 and 6 and in full lines in FIG. 4, and a steel ball 36 seats in the socket 24 therein.

A valve operating lever structure 28 having spaced, parallel side arms or plates 30 is anchored as at 33 as by machine screws at the forward corners thereof to the sides of lever-supporting structure 28, as clearly shown in FIGS. 1 and 5, and contains bores 32 therein each loosely pivoted on the trunnion pins 20, as shown in FIGS. 1 and 5. Bores 32 are only loosely pivoted on the trunnion pins 20 for the purpose of allowing free, self-aligned seating of the valve plate 22 on the valve seat 18 with the maximum effective sealing thereon when the valve is closed making wear pads unnecessary because the large-clearance bore 32 shown provides freedom of action, accommodation of manufacturing tolerances and take-up for valve plate 22 wear on valve seat 18.

A ball socket 34 is centrally located in the inner face of the lever supporting structure 28 roughly below the juncture of a handle 29 with said support structure 28, as shown in FIGS. 4 and 6, and lies in line with the ball socket 24 and adjacent thereto. Steel ball 36 saddles in both socket 24 and socket 34 in said valve plate 22 and lever structure 28 to provide self-aligning back-up of the arcuate valve plate 22 against the arcuate valve seat 18 and to transmit the hand and spring operating forces on the handle 29 to slidingly open and close the valve plate 22 thereon.

The self-closing and sealing mechanism 38 of the valve of this invention, as shown in FIGS. 1, 2, 3 and 5, comprises coil springs 40 the axes of which are oriented in parallel relation with respect to the centerline "X" of the discharge orifice 12 in a location outside the body 10 and offset in the direction of the closing of the valve thereto. Fixed spring-end seating lugs 42 having clearance bores 43 with axes substantially parallel to the centerline "X" of the discharge orifice are mounted to the body 10 adjacent to and outside of the discharge orifice 12 on the respective lines of action of the springs 40. The opposite ends of said springs 40 seat against respective spring shoes 46.

Spring shoe seats 44 of semi-circular form are cut in each side arm or plate 30, as shown in FIGS. 1 and 5, having centers which, when the valve is closed, lie on reference lines 31 which are perpendicular to the centerline "X" of the discharge orifice 12 and which pass through the common centers of the trunnion pins 20 on the side of said pins 20 in the direction of the closing of said valve. When the valve is opened, the center of seats 44 rotate with the side arm or plate 30 about the pins 20 as centers in a counterclockwise direction when viewed from the front side of the valve to further compress springs 40, as shown in FIG. 5.

Spring shoes 46 pivotally seat in respective shoe seats 44, as shown in FIGS. 1 and 5. Slide rods 48, which are coaxial with and on the line of action of the axis of each spring 40, are fixedly mounted at one end to the respective shoes 46, and are loosely slidable at the other end through respective bores 43 in the lugs 42 on the valve body 10, as shown in FIGS. 1, 2, 3 and 5. The slide rods 48 serve to guide springs 40 and to maintain square end seating of spring 40 on the shoes 46 at all times.

The advantages of applicant's valve are best seen in FIGS. 1 and 5, one showing the valve plate 22 closed and the other open. Note the angle "A" between the line of action of the compression springs 40 and the torque arms 31. In the valve-closed position, the angle "A" is roughly a right angle which is the optimum for rotation of the side arms or plates 30 and that the pressure of the valve plate 22 on the valve seat 18 is best for maximum sealing. In the valve-open position, the mechanical advantage of the valve-operating mechanism 38 is a minimum giving ease of holding valve plate 22 open, because the angle "A" is much larger than a right angle. In this configuration, the force of spring 40 is greater but the effectiveness thereof is lower. If the angle were 180°, the spring force would be highest but the ability to produce rotation would be zero. Thus the hand force required to open and hold the valve plate 22 open does not increase as fast as the force developed by compressing the springs 40, making for easier operation. Also, as the valve plate 22 is opened, the vector of force pressing the valve plate 22 against the valve seat 18 becomes less direct, thus reducing the resistance to opening and closing.

Although but one specific embodiment of this invention is herein shown and described, it will be understood that details of the construction shown may be altered or omitted without departing from the spirit of the invention as defined by the following claims.

I claim:

1. A self-closing, guillotine-type, shutoff valve with a body having a cylindrically arcuate valve plate and valve seat centered on an axis passing sidewise through and substantially intermediate between a discharge orifice end and a pipe fitting end of the body of the valve, the improvement in valve operating mechanism comprising:
   a. a hand lever means pivotally mounted on the sides of the valve body on the axis thereof and operationally connected to the valve plate by self-aligning means for the hand-opening of the valve, and
   b. compression spring means mounted between the hand lever means and the valve body offset from and substantially parallel to the centerline of the valve discharge orifice in the direction of valve closing, whereby the maximum effectiveness for self-closing of the valve and the maximum pressure for sealing of the valve plate on the valve seat is obtained when the valve is shut.

2. In the self-closing, guillotine-type valve as set forth in claim 1 wherein the hand lever means comprises:
   a. a pair of trunnion pins on said axis mounted on the body on the opposed sides thereof at roughly the intersection of the centerline of the discharge orifice end and the centerline of the pipe fitting end, and
   b. a hand lever structure having opposed side-arms astride the sides of and loosely pivoted to the trunnion pins on the body of the valve.

3. In the self-closing, guillotine-type valve as set forth in claim 1 wherein the compression spring means comprises:
   a. shoe means pivotally mounted to said side-arms in first planes perpendicular to the trunnion axis and outside the body of the valve at centers offset from and at substantially right angles to the centerline of the discharge orifice in the direction of valve closing when the valve is closed,
   b. seating lugs substantially in said first planes and having clearance bores with axes substantially parallel to said centerline of the discharge orifice and offset therefrom in substantially parallel relation thereto, fixedly mounted to the body of the valve adjacent to the discharge orifice,
   c. slide rods having first ends fixedly mounted to said shoe means and loosely extending in roughly parallel relation to the centerline of the discharge orifice through said bores in the seating lugs, and
   d. said compression spring means loosely mounted on said slide rods between said seating lugs at one end and said shoe means at the other.

4. In the self-closing, guillotine-type valve as set forth in claim 1 wherein the self-aligning means comprises a ball interposed between sockets located on the hand lever means and the valve plate, respectively, and centrally located thereon.

* * * * *